(12) United States Patent
Hoffmann (10) Patent No.: US 9,213,688 B2
(45) Date of Patent: Dec. 15, 2015

(54) SMART DATE SELECTOR

(71) Applicant: Florian Hoffmann, Walldorf (DE)

(72) Inventor: Florian Hoffmann, Walldorf (DE)

(73) Assignee: SAP SE, Walldorf (DE)

( * ) Notice: Subject to any disclaimer, the term of this patent is extended or adjusted under 35 U.S.C. 154(b) by 320 days.

(21) Appl. No.: 13/775,866

(22) Filed: Feb. 25, 2013

(65) Prior Publication Data

US 2014/0244795 A1    Aug. 28, 2014

(51) Int. Cl.
*G06F 15/16* (2006.01)
*G06F 17/27* (2006.01)
*G06F 17/24* (2006.01)

(52) U.S. Cl.
CPC .............. *G06F 17/27* (2013.01); *G06F 17/243* (2013.01)

(58) Field of Classification Search
USPC ................................................ 709/201, 203
See application file for complete search history.

(56) References Cited

U.S. PATENT DOCUMENTS

| | | | |
|---|---|---|---|
| 2006/0020815 A1 | 1/2006 | Varghese et al. | |
| 2008/0109285 A1* | 5/2008 | Reuther et al. | 705/7 |
| 2008/0183780 A1* | 7/2008 | Amabile et al. | 708/100 |
| 2011/0145424 A1* | 6/2011 | Sattari et al. | 709/229 |
| 2011/0302031 A1* | 12/2011 | Chen et al. | 705/14.53 |

* cited by examiner

*Primary Examiner* — Jason Recek
(74) *Attorney, Agent, or Firm* — Brake Hughes Bellermann LLP (57) ABSTRACT

The present description refers to a method, apparatus and computer-readable storage medium for receiving a date request from a client application if a date description is not a valid date, the date request including the date description and one or more attributes, comparing the date description to a smart date table, identifying one or more dates corresponding to the date description based on the comparing, and returning the one or more dates to the client application.

22 Claims, 9 Drawing Sheets

SMART DATE SELECTOR

TECHNICAL FIELD

This description is directed generally to date selection, and in particular, to a smart date selector.

BACKGROUND

Date pickers, or date selectors, may allow a user to input a date based on text or selection of a date by a selection of a day from a calendar. A user may input a date by inputting numerical information corresponding to day, month and year. Alternatively, in some systems, a user may select a calendar icon, and then select a month and a day, and the system may fill in a date within a date box corresponding to the month, day and year selected.

SUMMARY

In one general aspect, a computer-readable storage medium is provided that stores one or more programs. The one or more programs include instructions, which when executed by a computer, cause the computer to: receive a date request from a client application if a date description is not a valid date, the date request including the date description and one or more attributes, compare the date description to a smart date table, identify one or more dates corresponding to the date description based on the comparing; and return the one or more dates to the client application.

In another general aspect, a computer implemented method is provided that includes receiving a date request from a client application if a date description is not a valid date, the date request including the date description and one or more attributes, comparing the date description to a smart date table, identifying one or more dates corresponding to the date description based on the comparing, and returning the one or more dates to the client application.

In another general aspect, an apparatus includes receiving logic is configured to receive a date request from a client application if a date description is not a valid date, the date request including the date description and one or more attributes and comparing logic that is configured to compare the date description to a smart date table. The apparatus also includes identifying logic configured to identify one or more dates corresponding to the date description based on the comparing, and returning logic configured to return the one or more dates to the client application.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
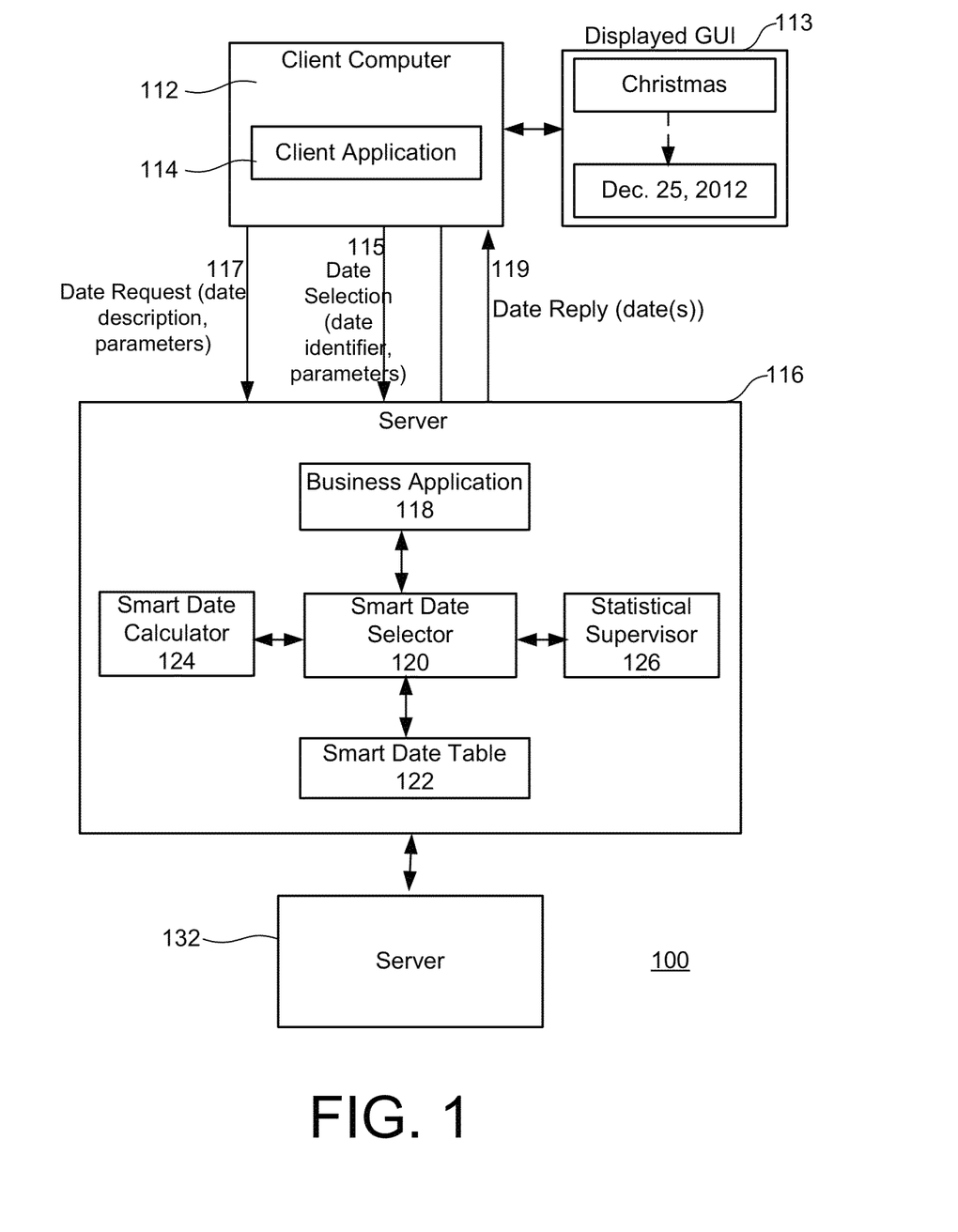
FIG. 1 is a block diagram of a system according to an example implementation.

FIG. 1 is a block diagram of a system 100 according to an example implementation. System 100 includes a client computer 112 and a server 116. Client computer 112 may include a processor for executing instructions and providing control for computer 112, a memory for storing computer instructions and other information, input and output devices (not shown). Computer 112 may also include a client application 114, such as a Web browser, or other client application. Client application 114 may also display a graphical user interface (GUI) 113 to a user via a display provided as part of computer 112.

Server 116 (which may also be referred to as a computer) may include a processor for processing software or instructions and memory (not shown). A business application 118 may be installed and running or executing on server 116. Business application 118 may be, for example, a time entry or billing program, an inventory tracking program, a calendar or email program, an enterprise resource planning (ERP) application, or any other business application.

A smart date selector 120 is also installed and running/executing on server 116 and may provide services relating to date selection. For example, smart date selector 120 may select or provide one or more dates based on at least a date description, which may be provided as a text string, for example.

According to one example implementation, a user may input a date description as one or more characters (e.g., a text string), and the date description may be received by the client application 114. Alternatively, the date description may be input directly to server 116, such as input to business application 118 or smart date selector 120.

In this example, it may be determined (e.g., by client application 114 comparing the received date description to a valid date format) whether the received date description is in a valid date format, such as DDMMYYYY, or DD/MM/YYYY (as examples), where YYYY is the year, MM is the month, and DD identifies the day. The characters input for each of DD, MM and YYYY, for a valid date format, would be input as numbers or numerical characters. Therefore, according to an example implementation, it may be determined (e.g., by client application 114, or business application 118) if the received date description is in a valid date format as either DDMMYYY or DD/MM/YYYY format, where only numbers and slashes (/) are permitted in this example. In this example, if the date description contains any alphabetic characters, then this would indicate that the date description is not in a valid date format.

If the received date description matches a valid date format, then, for example, the received date/date description may be stored in the client application 114 and/or client computer 112 (and/or business application 118 if the date description is input to business application 118). Also, the received date may be forwarded by client application 114 (e.g., via a Hyper Text Transfer Protocol or HTTP request) to the business application 118 for storage and/or processing. For example, a user may enter a date or date description into a text box of GUI 113 as part of a billing program that is running as the business application 118. The date may, for example, be stored (e.g., by client 114, smart date selector 120, and/or business application 118) using an internal storage representation which may be of the format, for example DDMMYYY, which in some cases may be a different format than the received date/date description.

Also, in response to receiving a date or date description and determining that the received date description is in a valid date format, client application 114 may replace the received date/date description (which may be provided in a valid numerical representation, for example) input to a text box of a graphical user interface (GUI) 113 by a user with a corresponding date in a display format (e.g., that may identify the month using letters). Therefore, for example, the input date in the text box may be auto-replaced by the client application 114 with the same or corresponding date in the display format, and this auto-replaced date in the text box may be displayed to the user as part of the GUI 113 presented by the client application 114 to the user. For example, if a date 15/05/2011 is entered by a user as a valid date into a text box of the GUI 113, then client application 114 may determine or identify the corresponding display format of such valid date as May 15, 2011. The client application 114 may then (e.g., automatically, or without further input or request from the user) replace the input date description (e.g., 15/05/2011) in the displayed text box with this corresponding display format (e.g., May 15, 2011) of the date, which is then displayed to the user. This is merely one illustrative example, and the various implementations are not limited thereto.

According to an example implementation, if the received date description does not match the valid date format(s) (e.g., client application 114 determines that the received date description is not a valid date), which may occur, for example, if the received date description includes any letters or any other characters not permitted by the valid date format(s), a date request is generated by and sent from client application 114 to business application 118 and/or smart date selector 120, e.g., to request a date(s) that corresponds to the date description. The date description may include a text string, which may include, for example, a group of characters, a phrase, or one or more words, such as "Christmas", "Thanksgiving," "Independence Day," "Tuesday," or "my birthday." These are merely examples, and many other date descriptions may be received and/or included within a date request.

According to an example implementation, the date request sent from client application 114 to smart date selector 120 may include the received date description, and may also include one or more parameters or attributes for the date request or that may be associated with the date request or date description. Some example parameters may include a country identifier to identify a country (e.g., England, United States, Germany, India, or other country), a language identifier to identify a language (e.g., English, German, Japanese, or other language), a company identifier to identify a company or group for which this date description is associated or for which the user, a region identifier to identify a region of the world (e.g., Asia, America, Europe, or other region) or a region within a country, and a tense identifier to identify a tense associated with the date request or the date description. In some cases, some of these parameters may be associated with a user or with a computer (e.g., country, language, region).

According to an example implementation, the tense identifier may identify either past tense or future tense, and may be used to determine a date(s) based on an (e.g., ambiguous) date description, or to narrow a list of dates down to one or a few dates that match the tense, or may be used to prioritize or list one or more dates that are provided or returned, for example. For example, if the date description is "Tuesday" then a tense identifier set to past tense for the date request or date description may be used by the smart date selector 120 to identify and return the date of the last Tuesday or other previous/past Tuesday, while a tense identifier set to future tense may cause smart date selector 120 to identify and return the date of a future Tuesday (or one or more future Tuesdays), such as next Tuesday (or other future Tuesday). For example, if the date description is "Christmas" then the returned date may include a date of the next or upcoming Christmas if the tense or tense identifier is future, while a date of a past or date of the immediately previous Christmas may be identified and returned if the tense identifier is past.

Alternatively, rather than just one date, a group or plurality of dates may be returned from the smart date selector 120 that correspond to the date description. In an example implementation, these group of dates may either be 1) selected such that all dates of the group match the tense identifier; or 2) the group of dates may include both one or more dates that match the tense identifier and one or more dates that do not match the tense identifier, where the dates may be ordered or prioritized in a list with the date(s) corresponding to or matching the tense identifier provided first in the list (e.g., located first or at the top of the list, or highest priority), and the date(s) not corresponding to the tense identifier being listed in a lower or non-priority location in the returned list of dates.

Smart date selector 120 may, for example, use a smart date table 122 to determine one or more dates that correspond to a date request or a date description and associated parameters(s). For example, if the date request is received by the business application 118, the business application 118 may forward the date request to smart date selector 120. Smart date selector 120 may compare the date description and any parameter(s) to smart date table 122 to determine and provide a date(s) corresponding to the date description and parameter(s) provided in the date request.

For example, the received date description may be compared to one or more date description entries of the smart date table 122 to determine if the received date description matches (either exactly or substantially) one or more of the date description entries. If a match is found, then these matching entries may be narrowed down to just one (or few, for example) date description entry/entries based on one or more received parameters. The smart date table 122 may also include parameter entries for one or more parameters, such as country, language, tense, etc. By way of example, Table 1 below identifies a portion of an example smart date table.

TABLE 1

Example of a Smart Date Table 122

| Date Description | Germany | United States | India |
|---|---|---|---|
| Christmas | December 24 | December 25 | December 25 |
| Independence Day | NA | July 4 | August 15 |

The example smart date table shown in Table 1 illustrates how different date descriptions, along with different country identifiers (as an example parameter), can be used by smart date selector 120 to identify different matching dates. The two example date descriptions listed in Table 1 are "Christmas" and "Independence Day." The dates corresponding to these date descriptions are different for different countries. For example, Christmas is celebrated on December 25 in the US and in India, but is celebrated on December 24 in Germany. Similarly, Independence Day is celebrated on July 4 for the US and August 15 for India. Thus, as shown in Table 1, smart date selector 120 may determine one or more dates corresponding to a date description and one or more parameters, such as country (provided in a country identifier parameter), in this example. This is merely one simple illustrative example, and a smart date table 122 may include or may identify date(s) corresponding to a wide variety of date descriptions and parameters, and may be provided in a variety of different formats. Also, the language identifier may, for example, be used to determine the language in which the date may be displayed, e.g., the month of the date. Thus, based on the language parameter, the date displayed to the user may display the month in the specified language, for example.

In another example implementation, the smart date table 122 may include three columns "ID", "Description" and "Date". Table 2 demonstrates this example implementation. The column "ID" may serve as the primary key of the table and facilitates creating, changing and deleting the table's entries. The smart date selector 120 may compare the received date description to the entries in the column "Description" to find matches. Such a comparison may be done, for example, with an SQL (Structured Query Language) query of the form "SELECT . . . WHERE Description LIKE '% abc %'", where "abc" is the date description received from the client computer 112. This form of query may find any occurrence of the received date description in the column "Description" of the table. Another way to do the comparison may be, for example, to use a prefix comparison of the form "LIKE 'abc %'". This form of query may find only table entries starting with the received date description. Once the matching entry or entries are determined, they may be sent to the client computer 112 in the date reply 119. The values in column "Date" may be provided in a technical format to simplify the communication between the server 116 and client computer 112. In this example implementation, only absolute dates with all components—year, month and day— are provided. Such an implementation may be updated often, e.g., at least once a year, to make sure the provided dates remain correct.

TABLE 2

Example of a Smart Date Table 122

| ID | Description | Date |
|---|---|---|
| CHRIST | Christmas | 20131225 |
| WEIHN | Weihnachten | 20131224 |
| INDEP | Independence Day | 20130704 |

In a more advanced example implementation, shown in Table 3, the smart date table 122 may contain three columns "Year", "Month" and "Day" instead of a single column "Date". In this implementation, one or more of the date segments "Year", "Month" and "Day" may remain empty. Emptiness may be indicated, for example, by the special database value "NULL", by an empty string ' ', or by any other means technically convenient for the smart date selector 120. In this example implementation, matching entries identified by the smart date selector 120 may not be directly sent to the client computer 112 because they are incomplete. Instead, the smart date selector 120 may hand the matching entries over to a smart date calculator 124 to fill up the empty date segments. The smart date calculator 124 may also be provided with additional attributes, for example tense. Empty date segments may be filled up by smart date calculator 124 interpreting the tense to calculate the next, last, or nearest date that matches the filled date segments. For example, when requesting the entry "WEIHN" on Dec. 22, 2013, with tense future, the empty segment "Year" may be calculated by smart date calculator 124 as "2013", because "Dec. 24, 2013, is the next date that matches the filled segments "Month" and "Day". Similarly, with tense past, for the same request, the "Year" may be calculated by smart date calculator 124 as "2012".

TABLE 3

Example of a Smart Date Table 122

| ID | Description | Year | Month | Day |
|---|---|---|---|---|
| CHRIST | Christmas | 2013 | 12 | 25 |
| WEIHN | Weihnachten | NULL | 12 | 24 |
| INDEP | May | NULL | 05 | NULL |

In yet a more advanced example implementation, shown in Table 4, the smart date table 122 may contain an additional column "Rule". In this example implementation, the smart date calculator 124 may execute a second calculation after the first calculation described above with respect to Table 3, in which smart date calculator 124 determines the empty date segments based on one or more parameters or attributes. According to this example implementation, the server 116 and/or smart date selector 120 and/or smart date calculator 124 may be provided with a set of pre-defined rules. For example, smart date calculator 124 may receive and process each rule based on an entry of the smart date table 122 to calculate, for example, empty segments or overwrite filled segments based on the rule. The smart date calculator 124, may also receive additional attributes such as tense, and the received description, e.g., to be used for processing the rule(s). For example, a rule "THANKSGIVING" may be provided that may be used by smart date calculator 124 to calculate the 4$^{th}$ Thursday in November, to calculate either the nearest (tense present), next (tense future) or last (tense past) Thanksgiving Day.

TABLE 4

Example of a Smart Date Table 122

| ID | Description | Year | Month | Day | Rule |
|---|---|---|---|---|---|
| CHRIST | Christmas | 2013 | 12 | 25 | |
| WEIHN | Weihnachten | NULL | 12 | 24 | |
| THANKS | Thanksgiving | NULL | NULL | NULL | THANKS-GIVING |
| INDEP | May | NULL | 05 | NULL | |

The implementation described with reference to the examples of Table 4 may be varied to allow for customizable rules. For example, the entries in column "Rule" of the smart date table 122 may provide prefixes that state that they are either pre-defined or customized rules. An example of such prefixes may be "SAP" for pre-defined rules, and "Z" and "Y" for customized rules. When encountering a customized rule, the smart date calculator 124 may look up the rule in a place where a user may deposit executable code of his own. For example, a customized rule may be provided as a Business Add-In (BAdI) in an SAP system. If the smart date calculator encounters, for example, a rule "ZMYBIRTHDAY", it may decide to look up a Business Add-In implementation for this rule and execute the code deposited therein.

Any implementation of the smart date table 122 may be extended through logical views. Such a logical view may be, for example, a database view, or an SAP HANA Attribute View, Analytic View or Calculation View. SAP HANA is SAP AG's implementation of in-memory database technology. The logical view may complement the table data or provide additional functionality. For example, a SAP HANA Attribute View may be placed on top of the smart date table 122 to enable fuzzy text search on the column "Description" and thus enabling the smart date selector 120 to find more or better matches. Also, a logical view may be placed on top of a smart date table 122 that does not contain a column "Description"; the logical view may join the missing column from another database table, and may, for example, incorporate additional attributes such as the user's language to provide better-suited data. Moreover, the logical view may union or join one or more database tables to provide the smart date table. In this manner, a table containing only user-defined smart dates may be combined with a table containing pre-defined. According to one example implementation, an SAP application may use this, for example, to integrate a customizing table with the public holidays table THOL from the SAP Business Suite.

In one or more example implementations of the smart date table 122, the table 122 may be split up into a set of several joined tables to make the functionality more flexible. One such split may be, for example, to store the "Description" in a separate table, along with the language in that the descriptions are provided. This way, for example, the two language-dependent descriptions "Christmas" (English) and "Weihnachten" (German) may be joined to the same smart date "CHRIST", such that the smart date entry and its calculation parameters needs only be defined once, and descriptions for other languages can be added later on as required. Another split may be, for example, to join a search term table that provides additional search terms for a smart date. This allows, for example, to provide multiple descriptions in the same language for a particular date. For example, one may wish to provide the additional search term "X-Mas" for Christmas, without losing the original description "Christmas" or having to duplicate the calculation parameters.

One or more of the parameters may be set for a computer, or for a user, e.g., country, language, or other user-specific or computer-specific parameters. On the other hand, one or more parameters may be set by client application 114 or business application 118. For example, if business application 118 is a billing program, which may require time to be entered for previous dates, the tense identifier for any date requests associated with this program may be set to past. Other programs or services, offered by client application 114 and/or business application 118, may set the tense identifier to future. For example, the tense identifier may be set by client application 114, by a user, by business application 118, or by smart date selector 120. Some parameters may be set or identified by a user, e.g., user-specified parameters.

Therefore, a date request may be generated by client application 114, including a date description and one or more parameters (e.g., including one or more user-specified parameters, or client application-specified or client computer-specified parameters). Upon receipt, the business application 118 may add one or more parameters to the date request, such as, e.g., a tense identifier, and a company identifier, to generate an updated date request. The updated date request is then forwarded to the smart date selector 120 for processing/service. Smart date selector 120 may then determine one or more dates corresponding to the received date description and parameters, e.g., by comparing the received date description and one or more parameters to a smart date table 122 to identify one or more matching entries. These matching date(s) are then returned to the business application 118. Business application 118 then returns the matching date(s) to client application, e.g., via HTTP request or reply, shown in FIG. 1 as a Date reply 119.

In one example implementation, if smart date selector 120 is unable to find a match for a date description and associated parameters within smart date table 122, smart date selector may send a date reply 119 indicating an error condition (e.g., provided as a null indication, or indicating an error or failure to identify a corresponding date in the Date reply 119).

In another example implementation, if smart date selector 120 is unable to find a match in the smart date table 122 (or tables) to the date description and parameters, smart date selector 120 may send out a search request or other request to one or more other servers (such as to server 132), in attempt to obtain such requested date from another server 132. Any matching or corresponding dates obtained from server 132 may be returned to the client application 114 via Date reply 119. A date reply 119, indicating an error, or indicating that no date was found, may be sent if no such matching or corresponding date is found or obtained from server 132.

Table 5 below lists a number of different classes of example date descriptions.

TABLE 5

Example Date Descriptions

| Class | Date Descriptions |
|---|---|
| Holidays | Christmas, New Years Day, Independence Day, . . . |
| Weekdays | Monday, Tuesday, Wednesday, . . . |
| Vacations | Summer Holidays, Spring Break, . . . |
| Months | January, February, March, . . . |
| Seasons | Spring, Summer, Fall, Autumn, . . . |
| Personal Dates | My Birthday, Joe's Birthday, Wedding Day, . . . |
| Special events/ dates | My 30th Birthday, XXII Olympics, 3rd Wednesday in October, . . . |
| Calculations | In 3 Days, Next Working Day, Sunday before St. Patrick's, 2nd Wednesday from Now, . . . |

As shown in Table 5, the example classes of date descriptions may include holidays (e.g., Christmas, New Years day, Independence Day), weekdays (e.g., Monday, Tuesday, Wednesday, Thursday, Friday, Saturday, Sunday), vacations (summer holiday, which may be a specific time period for a country or for a company; Spring Break, which may be a specific time period for a country, for a school, etc., Christmas holiday or Winter holiday, etc.), Months (e.g., January, February, March, . . . ), Seasons (Spring, Summer, Fall, Winter), Personal date (e.g., my birthday, Joe's birthday, mom's birthday, wedding day, anniversary, . . . ), special events/dates (my $30^{th}$ birthday, XXI Olympics, $3^{rd}$ Wednesday in October, . . . ), and calculations or calculated dates (e.g., in 3 days, next working day, Sunday before Christmas, first working day after New Years day, $2^{nd}$ Wednesday from now, etc.).

In the case of a calculated date, smart date selector 120 may not find a matching date within smart date table 122, but rather, may determine or calculate a date(s) based on the date description, parameters, and other stored information. In some cases, smart date selector 120 may perform a mathematical operation, e.g., based on the date description and other information, to calculate one or more dates corresponding to the date description, for example. For example, the date description "in 3 days" may be received, and smart date selector 120 may add 3 days to a current date identified by a calendar to obtain the date corresponding to the date description, as an example.

According to an example implementation, some of the example date descriptions listed in Table 5 may correspond to multiple dates, such as two dates that specify a beginning and an end of a period of time, e.g., where these two dates corresponding to a date description may include a start date and an end date corresponding to the date description. For example, "Summer" may correspond to a beginning date and an ending date of this season. Similarly, "Spring Break" may correspond to a specific week for a school, for a country, etc., such as March 22-March 29. Thus, in such an example, the smart date selector 120 may receive a date request that includes a date description of "Spring Break", a country of US, and a school parameter of XYZ University, for example. In one example implementation, smart date selector 120 compares the date description "Spring Break" and the "XYZ University" to smart date table 122 to find or identify the start and end dates corresponding to this date description, e.g., March 22, March 29. These dates are then returned to client application 114 in a date reply 119 provided in response to the date request 117.

In a second example implementation, smart date selector 120 may not find XYZ University (or Spring Break for XYZ University) in the smart date table 122. Therefore, in order to identify the dates corresponding to this date request, smart date selector 120 may send a search request to web server 132 e.g., via a network to search for and retrieve the Spring Break dates, e.g., from the Web server 132 that hosts the website for XYZ University to obtain that Spring Break date information directly from XYZ University, or from other server or computer. The network (not shown) may, for example, include the Internet, a Local Area Network (LAN), or other network. Web server 132 may also include a smart date table 122A (or other table, database, or stored information) that may identify the dates for Spring Break at XYZ University. Web server 132 may then return the Spring Break dates to smart date selector 120, which may then forward these dates to the client application 114 via the date reply 119. In either case, a date description (and possibly one or more parameters) may be compared or used to perform a lookup in a smart date table 122/122A or other information to obtain the requested dates. The dates may then be forwarded to client application 114, and then may be inserted in a text box as part of the GUI 113 displayed to the user.

In another implementation, a statistical supervisor 126 may be introduced. According to an example implementation, the statistical supervisor 126 may receive date requests 117 and date selections 115 from the client computer 112. Date selections 115 are sent from the client computer 112 to the server 116 when the user accepts one of the dates suggested in a previous date reply 119. For example, the date selection 115 may be interpreted as confirmation that the user found what he searched for. The statistical supervisor 126 may store statistical information on the smart date usage. This statistical information may be used, for example, to automatically improve the results of the smart date selector 120. An example implementation may store, for example, how often a specific date was selected in a specific time frame. For example, it might store that the date "Christmas" was selected 342 times in calendar week 50 and 1,204 times in calendar week 51. This information may be used, for example, by the smart date selector, to rank matching entries differently, and provide more-often used dates first. Another usage of the statistical information may be to enable a system administrator to identify dates that are often requested but cannot be served because the smart date table does not contain the required entries.

Figure 2:
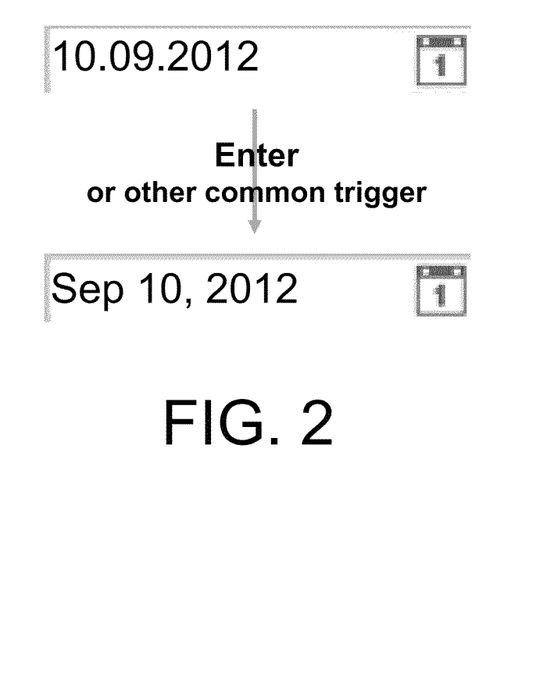
FIG. 2 illustrates operation of system 100 when a valid date is received.

Several examples will be briefly described with reference to FIGS. 2-15. FIG. 2 illustrates operation of system 100 when a valid date is received. A valid date, e.g., 10.09.2012, is input to GUI 113 by a user, and is sent to client application 114. Client application 114 determines that the received date is a valid date and returns for display, the display format of this date, e.g., Sep. 10, 2012. In this example, because client application determined that the received date is a valid date, client application 114 does not (or at least need not) send a date request to smart date selector 120. The display date Sep. 10, 2012 is automatically displayed on the GUI 113, for example, e.g., auto-replacing the numerical date input by the user.

The other FIGS. 3-15 involve the client application 114 receiving a date description, determining that the received date description is not a valid date, and then sending a date request with the received date description to smart date selector 120, e.g., via business application 118.

Figure 3:
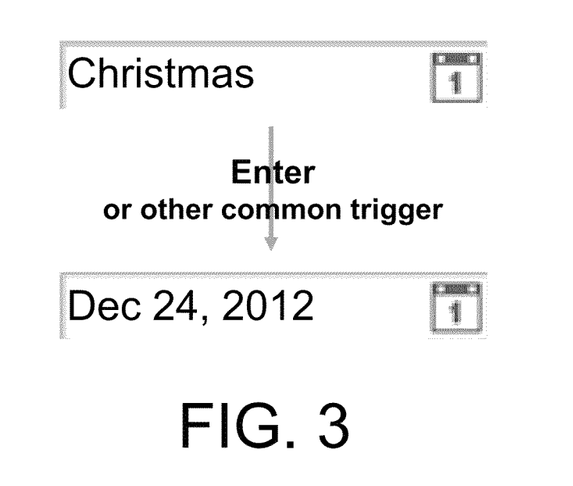
FIG. 3 is a diagram illustrating operation of system 100 when the date description "Christmas" is input by a user into GUI 113.

FIG. 3 is a diagram illustrating operation of system 100 when the date description "Christmas" is input by a user into GUI 113. In this example, a date request 117 may be received by smart date selector 120 that includes the date description ("Christmas" in this example), tense parameter set to future, and Germany as a country parameter. Smart date selector 120 may determine a date that matches the date description and parameter(s), e.g., based on a lookup into a smart date table 122. In this example, the matching date is Dec. 24, 2012, which is returned to business application 118, and then forwarded via date reply 119 to client application 114. Client application 114 then replaces in a text box of GUI 113 the date description (Christmas) with the corresponding date, which is then displayed to the user.

Figure 4:
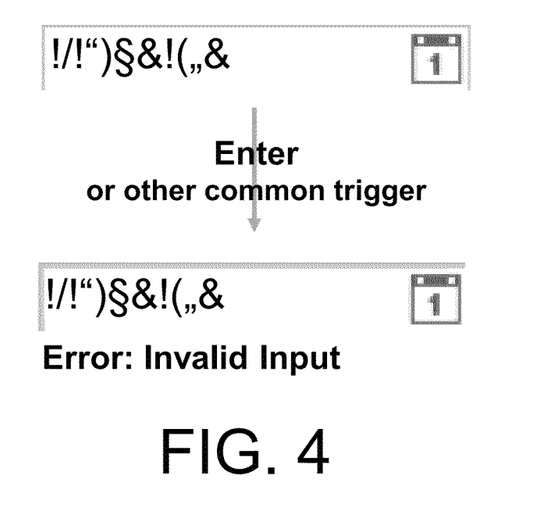
FIG. 4 is a diagram illustrating operation of system 100 when a date description, which is an invalid date, is input by a user.

FIG. 4 is a diagram illustrating operation of system 100 when the date description !/!")§&!(,& is input by a user. After determining that this date description is not a valid date, this date description is forwarded in a date request 117 to business application 118, and then forwarded to smart date selector 120. Smart date selector 120 attempts to determine a date corresponding to this date description, e.g., by performing a lookup in smart date table 122. However, in this case, no matching date is found for this date description, and smart date selector 120 may typically provide or return some indication of an error condition or otherwise indicate that no matching date was found. For example, the text of the input date description may be highlighted with a color (e.g., red) or other visual indication, or an error message may be returned for display, e.g., the text "Error: Invalid Input." The client application 114 may then replace the date description in a text box of GUI 113 with the error message or error indication, such as the "Error: Invalid Input" text string, or other error indication. Or, the error indication may be displayed in an additional text box displayed adjacent to the date description, as shown in FIG. 4.

Figure 5:
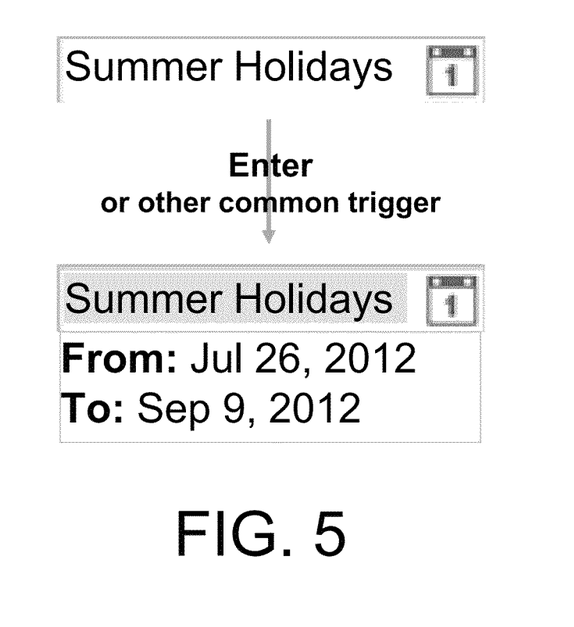
FIG. 5 is a diagram illustrating the return of multiple dates that match or correspond to a received date description according to an example implementation.

FIG. 5 is a diagram illustrating the return of multiple dates that match or correspond to a received date description according to an example implementation. In this example, the date description "Summer Holidays" is received by smart date selector 120, and is looked up in a smart date table 122, which returns two matching dates (Jul. 26, 2012, Sep. 9, 2012, in this example). According to an example implementation, when multiple dates are found or identified as corresponding to a date request (or date description and associated parameters), these multiple dates may be returned via date reply 119 and displayed in a drop down list of dates, for example. In another example, both (or multiple) dates may be displayed as suggested dates, where a user may select one (or more) of the suggested dates. When one of the dates is selected, this date may replace the date description in the text box input by the user. For example, if July. 26 is selected, then this date may replace the "Summer Holidays" text in the text box displayed to the user via GUI 113. Alternatively, a user may select multiple dates, such as a "from" date and a "to" date, or beginning and ending dates, for example, and these dates would be displayed and/or may replace the summer holidays date description. The from date and to date may define a from-to interval, e.g., for a season or other period of time. Also, a user may overwrite one or both of these dates, such as by typing in a new date, e.g., if the user wants to select a date that is between the from-to interval.

Figure 6:
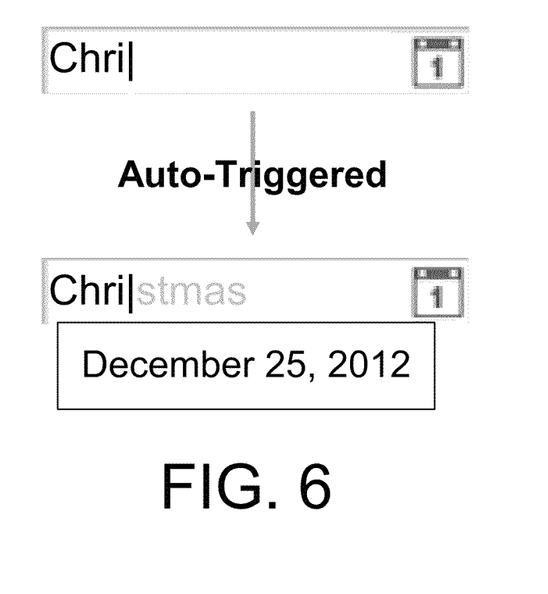
FIG. 6 is a diagram illustrating operation of a date description that auto-completes based on a partial input of the date description according to an example implementation.

FIG. 6 is a diagram illustrating operation of a date description that auto-completes based on a partial input of the date description according to an example implementation. In some cases, a date corresponding to a date description may be obtained before the entire date description has been entered by a user. As shown in FIG. 6, a portion ("Chri") of the date description "Christmas" is entered by a user. For example, after each letter input by a user into a text box of GUI 113 for a date description, the partial date description may be sent to smart date selector 120 via date request 117. At some point, sufficient letters, but still only a partial date description, will be received and used by smart date selector 120 to find a matching date description and corresponding date (or dates) via lookup into smart date table 120. In the example shown in FIG. 7, after a partial date description is input and forwarded to smart date selector 120, the smart date selector 120 may auto-complete the "Chri" string to the complete date description of "Christmas" and then may identify the corresponding date of December. 25. The smart date selector may then return via date reply 119 the complete date description (e.g., additional letters, to complete date description, shown in gray) and the corresponding date, which are displayed to the user via GUI 113, for example.

Figure 7:
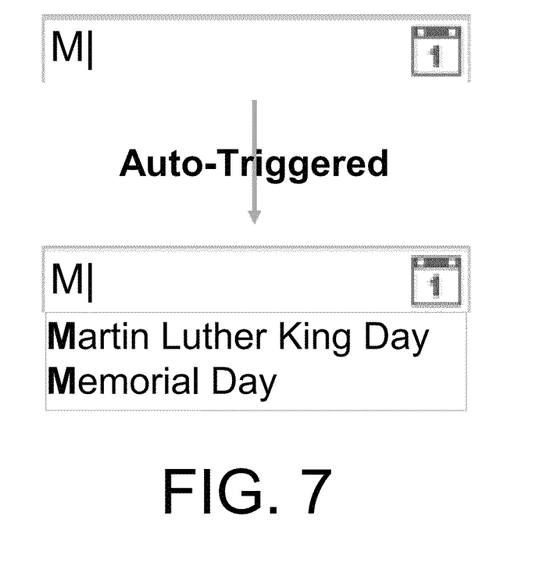
FIG. 7 is a diagram illustrating multiple corresponding date descriptions identified based on a partial date description.

FIG. 7 is a diagram illustrating multiple corresponding date descriptions identified based on a partial date description. In this example, the partial date description ("M") corresponds to two date descriptions, including Martin Luther King Day and Memorial Day. These may be the only date descriptions, or may be the most likely or most probable date descriptions, based on the partial date description. These two date descriptions are identified by smart date selector 120 based on the partial date description and one or more parameters, and may be returned to client application 114 for display as suggested matches for the partial date description, as shown in FIG. 7. For example, when a user selects one of the suggested date descriptions, e.g., Memorial Day, that selected date description may replace the partial date description, and then displayed to the user via GUI 113. Alternatively, the date corresponding to the selected date description (Memorial Day) may replace the partial date description.

Figure 8:
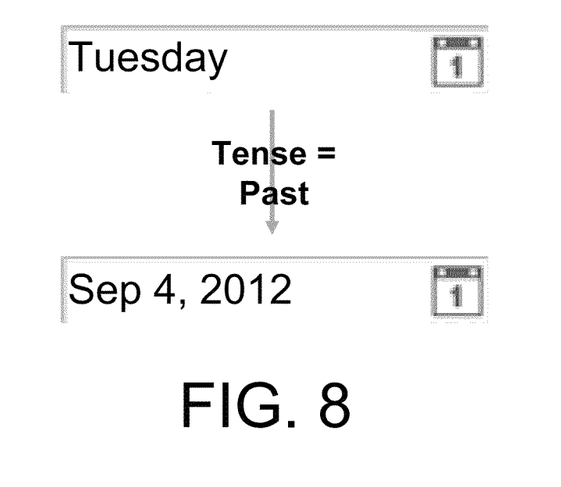
FIG. 8 is a diagram illustrating calculation of a date based on a date description and a tense parameter according to an example implementation.

FIG. 8 is a diagram illustrating calculation of a date based on a date description and a tense parameter according to an example implementation. As noted above, the tense parameter may be used to specify (at least a preference for) dates in either the future or the past. For example, a tense parameter may be used to identify a date corresponding to a date description, where such date(s) corresponding to the date description might be ambiguous. In this example, a date request is received by smart date selector 120 that includes a date description ("Tuesday") and at least a tense parameter (Past). Therefore, in this example, the smart date selector 120 may calculate or determine a previous (or immediately past) Tuesday, which would be Sep. 4, 2012, according to this example, where tense parameter specifies past, since September 4 is the immediately past Tuesday, for example. This date, Sep. 4, 2012, is then returned via date reply 119 for display by client application 114 to a user via GUI 113.

Figure 9:
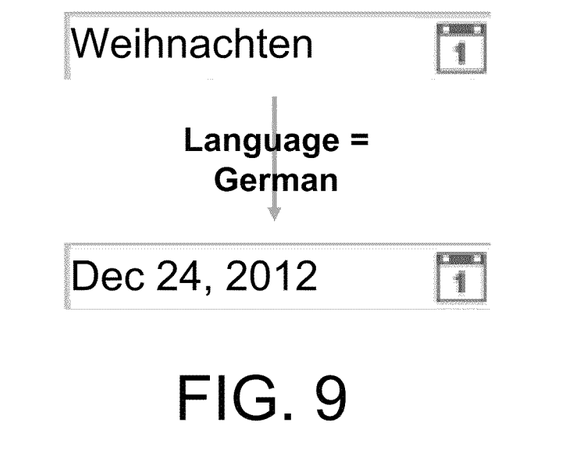
FIG. 9 is a diagram illustrating the processing of a date description in a language that is specified by a language parameter.

FIG. 9 is a diagram illustrating the processing of a date description in a language that is specified by a language parameter. In this example, a language parameter is specified as German, and a date description (in German) is received (Weihnachten), and a corresponding date of Dec. 24, 2012 is returned to the client application. A country parameter may also be specified in this example as Germany.

Figure 10:
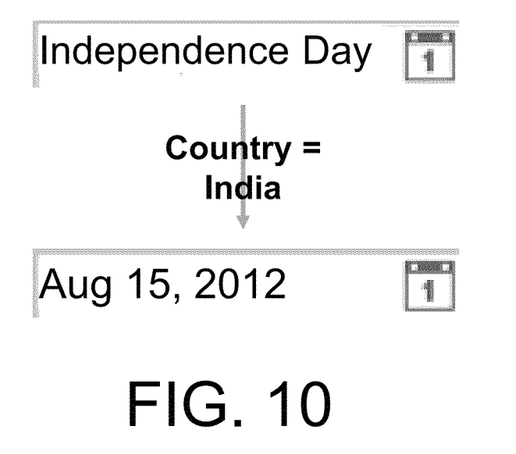
FIG. 10 is a diagram illustrating the processing of a date description where a Country parameter is specified as India.

FIG. 10 is a diagram illustrating the processing of a date description where a Country parameter is specified as India. In this example, a date is determined based on the date description (Independence Day) and the country parameter of India, and the corresponding date is returned (Aug. 15, 2012). A past tense parameter may specify a past Independence day, e.g., Aug. 15, 2012, and a future tense identifier may be used to specify a future Independence Day, e.g., Aug. 15, 2013.

Figure 11:
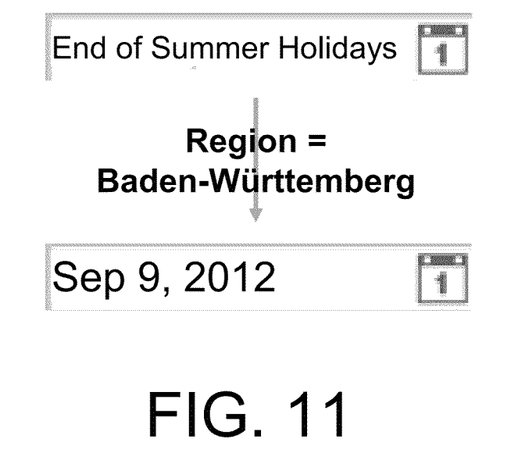
FIG. 11 is a diagram illustrating the processing of a date description where a region parameter is provided according to an example implementation.

FIG. 11 is a diagram illustrating the processing of a date description where a region parameter is provided according to an example implementation. In this example, a date (Sep. 9, 2012) is determined by smart date selector 120 corresponding to End of Summer Holidays for region=Baden-Wurttemberg.

Figure 12:
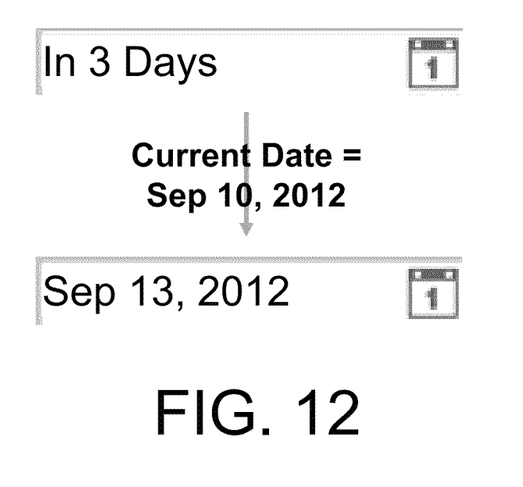
FIG. 12 is a diagram illustrating calculating a date based on a current date according to an example implementation.

FIG. 12 is a diagram illustrating calculating a date based on today's date according to an example implementation. In this example, a date description ("In 3 days") is provided, and smart date selector 120 determines the corresponding date by adding 3 days to a current date. In this example, tense parameter may be set, or may be implied, as future tense. And, the current date may be known by server 116, business application 118, and/or smart date selector 120. Alternatively, a base or reference date (e.g., today's date, or the current date in this example) may be provided as a parameter in the date request. A date may be calculated based on the date description and the base date or reference date, e.g., by adding or subtracting one or more days from the reference date, for example.

Figure 13:
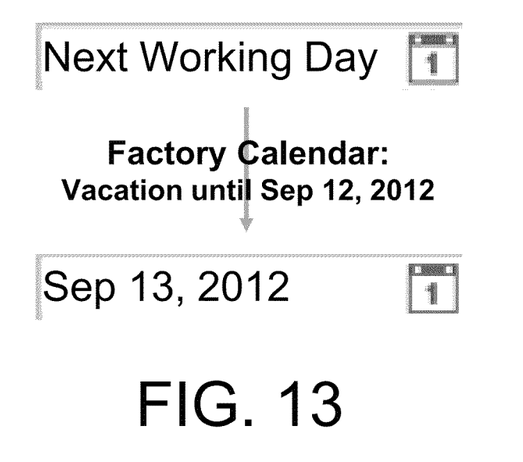
FIG. 13 is a diagram illustrating determination of a date based on a work calendar.

FIG. 13 is a diagram illustrating determination of a date based on a work calendar. In this example, client application 114, business application 118, and/or smart date selector 120 may have or may store a work calendar or corporate calendar for a company or other enterprise or organization that identifies work days, and non-work days, such as weekends, holidays, corporate holidays or plant shut-downs, and national holidays for each country, etc. In this example, the corporate calendar identifies a next working day as Sep. 13, 2012, based on a holiday or plant shut-down for the next few days. Therefore, in this example, smart date selector 120 may received the date description (next working day), and calculate the next working day based on the corporate calendar. This is merely an example, and other dates may be calculated related to a work calendar or other calendar.

Figure 14:
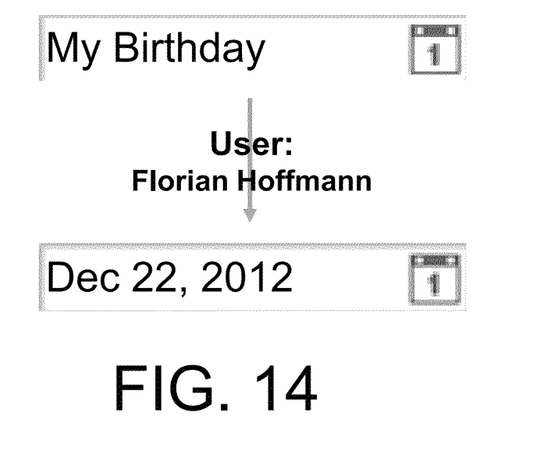
FIG. 14 is a diagram illustrating the calculation of a date based on one or more personal dates.

FIG. 14 is a diagram illustrating the calculation of a date based on one or more personal dates. In this example, client application 114, business application 118 or smart date selector 120 may have, or may have access to, one or more personal dates for a user, such as a date corresponding to my birthday, or the birthday of the user.

In a first example implementation with respect to FIG. 14, smart date table 122 may store personal dates for each of a plurality of users. A date request 117 is sent to smart date selector 120, including the date description (my birthday) and one or more parameters, such as a user ID (or user name). Smart date selector 120 may perform a table lookup in smart date table 122 to identify the birthday corresponding to a specific user ID.

In a second example implementation with respect to FIG. 14, smart date selector 120 may receive the date description (my birthday) and a user ID for a user. Smart date selector 120 may receive from the client application 114, or may have previously received and stored and may now access third party account (e.g., Facebook, Linked-In, . . . ) credentials (e.g., username or logon ID, password or other information for accessing Facebook, Linked-In or other third party account) for this user. In this example, the smart date selector 120, or business application 118, may have the user's access credentials to access the user's third party social networking account, such as Facebook, Linked-In or other site or other user account. For example, the user's Facebook account may store various personal dates for the user, such as the user's birthday, graduation dates for high school & college, the user's current town of residence and the user's hometown, where the user attended high school, the user's anniversary, where the user current works, the user's spouse, etc. In one example, in response to receiving the date description (my birthday) in a date request that also includes the user ID for the user, and a tense parameter (future tense), the smart date selector retrieves the user's Facebook access credentials (or other account), and then communicates with a Facebook server 132, provides the user's Facebook credentials, and obtains the user's birthday (or birth date) from the user's Facebook account. Based on the future tense, the smart date selector 120 then determines the next annual occurrence of the user's birthday (Dec. 22, 2012, for example), and returns this date via date reply 119 to client application 114.

Figure 15:
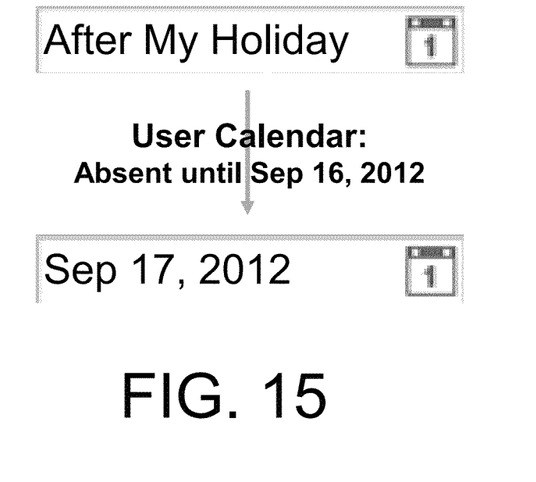
FIG. 15 is a diagram illustrating the calculation of a date based on a user's calendar according to an example implementation.

FIG. 15 is a diagram illustrating the calculation of a date based on a user's calendar according to an example implementation. In this example, the client application 114 may have access to the user's personal calendar, e.g., stored in client computer 112. In such a case, the client application 114 may identify the date corresponding to the user's holiday or vacation, which have been marked on the user's calendar. The client application, in this example, may determine the date corresponding to "after my holiday" as the first day after the user's vacation, and may display this date to the user via GUI 113.

However, in another example implementation with respect to FIG. 15, the client application 114 does not have the logic to determine or calculate a date based on the received date description, and this function is performed by application(s) or logic residing on server 116, such as by smart date selector 120. For example, the business application 118, and/or smart date selector 120 may have or may have access to the user's calendar, e.g., as part of smart date table 122, or stored at other location, and such personal or user calendar may indicate a holiday, absent or Out of Office through Sep. 16, 2012. The smart date selector 120 may determine the date corresponding to "after my holiday" as the first day after the user's vacation/holiday, e.g., Sep. 17, 2012, which is returned via date reply 119 to client application 114 and is displayed via GUI 113, as shown in FIG. 15.

Figure 16:
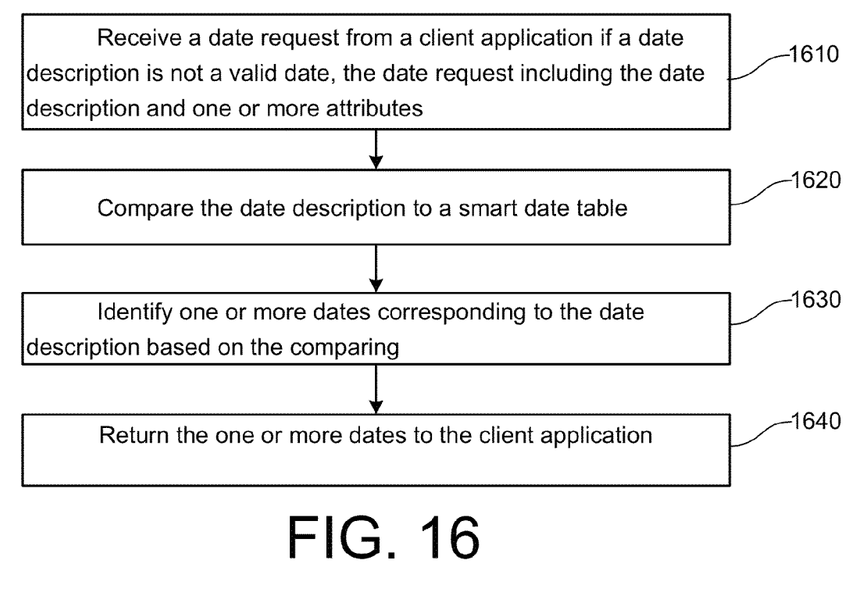
FIG. 16 is a flow chart illustrating operation of system 100 according to an example implementation.

FIG. 16 is a flow chart illustrating operation of system 100 according to an example implementation. At 1610, a date request is received from a client application if a date description is not a valid date, the date request including the date description and one or more attributes. For example, client application 114 may receive a date description and determine whether the date description is a valid date. If it is not a valid date, the client application 114 may generate and send a date request, including the date description, to business application 118 or smart date selector 120. Therefore, smart date selector 120 may receive a date request from client application 114 in the event that the received date description is not a valid date.

At 1620, the date description is compared (e.g., by smart date selector 120) to a smart date table 122.

At 1630, one or more dates are identified by smart date selector 120 corresponding to the date description based on the comparing.

At 1640, the one or more dates are returned to the client application. For example, the one or more identified dates are forwarded by smart date selector 120 to business application 118. Business application 118 may forward these one or more identified dates via date reply 119 to client application 114.

Figure 17:
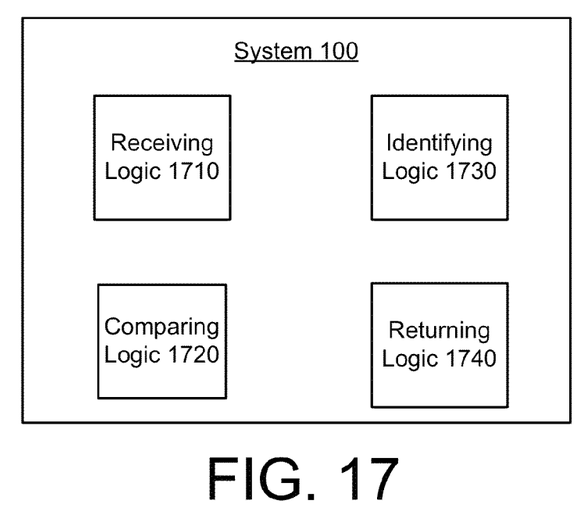
FIG. 17 is a diagram illustrating system 100 according to an example implementation.

FIG. 17 is a diagram illustrating system 100 according to an example implementation. Receiving logic 1710 is configured to receive a date request from a client application if a date description is not a valid date, the date request including the date description and one or more attributes. Comparing logic 1720 is configured to compare the date description to a smart date table. Identifying logic 1730 is configured to identify one or more dates corresponding to the date description based on the comparing. And, returning logic 1740 is configured to return the one or more dates to the client application.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer-readable storage medium storing one or more programs, the one or more programs comprising instructions, which when executed by a computer, cause the computer to:
   receive a date request from a client application if a date description associated with the data request is not a valid date, the date request including the date description and one or more attributes;
   compare the date description and the one or more attributes to a smart date table;
   identify a plurality of dates corresponding to the date description and the one or more attributes, the plurality of dates identified by:
      determining whether a portion of the date description matches at least one of a plurality of entries in the smart date table;
      determining whether at least one of the attributes matches at least one of the plurality of entries in the smart date table; and
   provide, to the client application, the plurality of dates in a prioritized order that lists dates corresponding to matching at least one of the attributes as a priority over any other of the identified dates that do not correspond to matching at least one of the attributes.

2. The computer-readable storage medium of claim 1 wherein the instructions further cause the computer to return a date corresponding to the date description to the client application based on the identifying, the client application replacing the date description that was input by a user into a text box with the one or more returned dates.

3. The computer-readable storage medium of claim 1 wherein the instructions further cause the computer to return one or more suggested dates corresponding to the date description to the client application based on the identifying, the client application displaying the one or more suggested dates in a text box.

4. The computer-readable storage medium of claim 1 wherein the date description describes a date to be calculated based on the date description.

5. The computer-readable storage medium of claim 1 wherein the date description describes one or more of:
   a holiday;
   a day of a week;
   a day of a month;
   a season; and
   a date to be calculated based on the description.

6. The computer-readable storage medium of claim 1 wherein the date request comprises a partial date description;
   wherein the instructions causing the computer to compare include instructions causing the computer to compare the partial date description to the smart date table;
   wherein the instructions causing the computer to identify include instructions causing the computer to identify a date description and one or more dates corresponding to the partial date description; and
   wherein the instructions causing the computer to return include instructions causing the computer to return to the client application the date description and the one or more dates corresponding to the partial date description.

7. The computer-readable storage medium of claim 6 and further comprising instructions that cause the client application to replace the partial date description displayed in a text box with the returned date description as an auto-complete operation, and to display the one or more dates corresponding to the partial date description.

8. The computer-readable storage medium of claim 1 wherein the one more attributes of the date request comprise at least a country identifier to identify a country and a language identifier to identify a language, wherein the one or more returned dates correspond to the date description and are specific to the identified country and language.

9. The computer-readable storage medium of claim 1 wherein the one or more attributes of the date request comprise at least a tense identifier to identify either past tense to specify past dates or future tense to specify future dates, wherein at least one of the one or more returned dates correspond to the date description and are specific to the identified tense.

10. A computer-implemented method comprising:
receiving a date request, at a server device and from a client application on a client device, in response to determining a date description associated with the date request is not a valid date, the date request including the date description and one or more attributes;
comparing, with the server device, the date description and the one or more attributes to a smart date table;
identifying, with the server device, a plurality of dates corresponding to the date description and the one or more attributes, the plurality of dates identified by:
determining whether a portion of the date description matches at least one of a plurality of entries in the smart date table;
determining whether at least one of the attributes matches at least one of the plurality of entries in the smart date table; and
providing, from the server device to the client application in the client device, the plurality of dates in a prioritized order that lists dates corresponding to matching at least one of the attributes as a priority over any other of the identified dates that do not correspond to matching at least one of the attributes.

11. The method of claim 10 and further comprising the client application replacing the date description that was input by a user into a text box with the one or more returned dates.

12. The method of claim 10 wherein the returning comprises returning one or more suggested dates corresponding to the date description to the client application based on the identifying, the client application displaying the one or more suggested dates in a text box.

13. The method of claim 10 wherein the date description describes a date to be calculated based on the date description.

14. The method of claim 10 wherein the date description describes one or more of:
a holiday;
a day of a week;
a day of a month;
a season; and
a date to be calculated based on the description.

15. The method of claim 10 wherein the date description comprises a partial date description;
wherein the comparing comprises comparing the partial date description to the smart date table;
wherein the identifying comprises identifying a date description and one or more dates corresponding to the partial date description; and
wherein the returning comprises returning to the client application the date description and the one or more dates corresponding to the partial date description.

16. The method of claim 10 and further comprising replacing, by the client application, the partial date description displayed in a text box with the returned date description as an auto-complete operation, and displaying, by the client application, the one or more dates corresponding to the partial date description.

17. The method of claim 10 wherein the one more attributes of the date request comprise at least a country identifier to identify a country and a language identifier to identify a language, wherein the one or more returned dates correspond to the date description and are specific to the identified country and language.

18. The method of claim 10 wherein the one or more attributes of the date request comprise at least a tense identifier to identify either a past tense to specify past dates or a future tense to specify future dates, wherein at least one of the one or more returned dates correspond to the date description and are specific to the identified tense.

19. The method of claim 10 wherein the one or more attributes of the date request comprise at least a tense identifier to identify either a past tense to specify past dates or a future tense to specify future dates, wherein the one or more returned dates correspond to the date description and are specific to the identified tense.

20. The method of claim 10 wherein the one or more attributes of the date request comprise at least a tense identifier to identify either a past tense to specify past dates or a future tense to specify future dates, wherein the one or more returned dates that correspond to the tense identifier are listed first as a priority over any other dates that do not correspond to the tense identifier.

21. An apparatus comprising:
receiving logic receiving a date request from a client application if a date description associated with the data request is not a valid date, the date request including the date description and one or more attributes;
comparing logic for comparing the date description and the one or more attributes to a smart date table;
identification logic for identifying a plurality of dates corresponding to the date description and the one or more attributes, the plurality of dates identified by:
determining whether a portion of the date description matches at least one of a plurality of entries in the smart date table;
determining whether at least one of the attributes matches at least one of the plurality of entries in the smart date table; and
providing, to the client application, the plurality of dates in a prioritized order that lists dates corresponding to matching at least one of the attributes as a priority over any other of the identified dates that do not correspond to matching at least one of the attributes.

22. The method of claim 21 and further comprising replacement logic provided at the client application for replacing the date description that was input by a user into a text box with the one or more returned dates.

* * * * *